(12) United States Patent
Jang

(10) Patent No.: US 9,784,203 B2
(45) Date of Patent: Oct. 10, 2017

(54) METHOD FOR LIMITING ENGINE TORQUE WHEN ERROR OCCURS IN WATER SENSOR OF FUEL FILTER

(71) Applicant: HYUNDAI MOTOR COMPANY, Seoul (KR)

(72) Inventor: Hwa Yong Jang, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 106 days.

(21) Appl. No.: 14/863,435

(22) Filed: Sep. 23, 2015

(65) Prior Publication Data
US 2016/0121882 A1 May 5, 2016

(30) Foreign Application Priority Data
Nov. 5, 2014 (KR) ........................ 10-2014-0152624

(51) Int. Cl.
| | |
|---|---|
| *B60W 20/00* | (2016.01) |
| *B60W 10/08* | (2006.01) |
| *F02D 41/22* | (2006.01) |
| *B60W 10/30* | (2006.01) |
| *B60W 20/50* | (2016.01) |
| *F02M 37/22* | (2006.01) |
| *F02N 11/08* | (2006.01) |

(52) U.S. Cl.
CPC .......... *F02D 41/222* (2013.01); *B60W 10/08* (2013.01); *B60W 10/30* (2013.01); *B60W 20/50* (2013.01); *F02D 2250/26* (2013.01); *F02M 37/221* (2013.01); *F02N 11/0814* (2013.01); *Y02T 10/40* (2013.01); *Y02T 10/6286* (2013.01); *Y10S 903/902* (2013.01)

(58) Field of Classification Search
CPC ......... B60W 20/50; B60W 2710/0666; B60W 2560/00; B60W 10/08; B60W 10/30; B60W 10/06; F02D 41/222; F02D 2250/26; B60K 6/20; F02M 37/221; F02N 11/0814; Y02T 10/40; Y02T 10/6286; Y10S 903/902
See application file for complete search history.

(56) References Cited

U.S. PATENT DOCUMENTS

| | | | |
|---|---|---|---|
| 6,596,174 B1 * | 7/2003 | Marcus ................ | B01D 36/003 210/104 |
| 2002/0053199 A1 * | 5/2002 | Sato ...................... | F01N 3/0835 60/277 |

(Continued)

FOREIGN PATENT DOCUMENTS

| | | |
|---|---|---|
| JP | 1999-107782 A | 4/1999 |
| JP | 3932514 B2 | 6/2007 |

(Continued)

*Primary Examiner* — Jason Holloway
(74) *Attorney, Agent, or Firm* — McDermott Will & Emery LLP

(57) ABSTRACT

A method for limiting an engine torque when a failure occurs in a water sensor of a fuel filter includes sensing the failure of the water sensor installed in the fuel filter through a failure diagnosis logic in a diesel hybrid vehicle. A current vehicle driving mode is checked when the failure of the water sensor is sensed. Whether or not a first time period elapses a first delay time after sensing the failure of the water sensor when the current vehicle driving mode is an engine driving mode is determined. The engine torque is limited and reduced when the first time period elapses the first delay time.

5 Claims, 3 Drawing Sheets

(56) References Cited

U.S. PATENT DOCUMENTS

| | | | | |
|---|---|---|---|---|
| 2003/0106304 A1* | 6/2003 | Miyahara | .............. | F02D 41/222 60/277 |
| 2005/0137780 A1* | 6/2005 | Gosho | ................... | F02D 41/064 701/113 |
| 2014/0222316 A1* | 8/2014 | Murai | ................... | F02D 41/064 701/104 |

FOREIGN PATENT DOCUMENTS

| | | |
|---|---|---|
| KR | 10-0190881 B1 | 6/1999 |
| KR | 10-2003-0025333 A | 3/2003 |
| KR | 10-2006-0002156 A | 1/2006 |
| KR | 10-0667378 B1 | 1/2007 |
| KR | 10-2007-0060474 A | 6/2007 |
| KR | 10-2014-0002298 A | 1/2014 |

\* cited by examiner

-- Related Art --

-- Related Art --

-- Related Art --

METHOD FOR LIMITING ENGINE TORQUE WHEN ERROR OCCURS IN WATER SENSOR OF FUEL FILTER

CROSS-REFERENCE TO RELATED APPLICATION

This application claims under 35 U.S.C. §119(a) the benefit of priority to Korean Patent Application No. 10-2014-0152624 filed on Nov. 5, 2014, the entire content of which is incorporated herein by reference.

TECHNICAL FIELD

The present disclosure relates to a method for limiting an engine torque of a water sensor. More particularly, the present disclosure relates to a method for limiting an engine torque capable of informing a driver during an engine driving mode when an error occurs in a water sensor of a fuel filter for a diesel hybrid vehicle is sensed.

BACKGROUND

An internal combustion engine of a vehicle can be generally classified into a gasoline engine and a diesel engine.

In the gasoline engine, which uses gasoline as a fuel, air and the gasoline fuel are mixed and compressed inside a cylinder to achieve combustion.

In the diesel engine, which uses diesel as a fuel, air enters a cylinder by a piston and compressed by high pressure, and thereafter, the fuel is injected at a high temperature and a high pressure to achieve combustion through self-ignition.

The diesel engine has higher thermal efficiency than the gasoline engine and lower fuel consumption. Further the fuel for the diesel engine is inexpensive, operation cost is economical, and a usage range of the diesel fuel is wide, and as a result, there is flexibility in using alternative fuel.

Recently, a diesel hybrid vehicle having the diesel engine and an electric motor as driving sources has been developed.

Since a great quantity of impurities and moisture are included in the diesel engine, a filtering process of removing the impurities and the moisture is required before supplying the fuel to the diesel engine in which a fuel filter is mounted and used for filtering.

When the moisture is introduced into the diesel engine, flow of the fuel is interfered due to cold weather in the wintertime, which causes a start failure or an idle failure and further causes discharged gas not to satisfy a discharged gas regulation value.

In the diesel engine, the fuel lubricates fuel associated parts, such as a high-pressure pump, a common rail, an injector, and the like, and when the moisture is introduced into such fuel associated parts and the fuel filter, damages and corrosion occur in the diesel engine.

Accordingly, the fuel filter includes a filtering element for removing the impurities and a moisture separator for separating the moisture, which is included in the fuel, and for storing the separated moisture in a fuel tank.

The fuel tank of the moisture separator stores water in which the moisture which is collected and stagnates and includes a water sensor for sensing the water.

The water sensor has a switch in which (+) and (−) terminals contact with each other when a water level in the fuel tank reaches a predetermined amount. When the water sensor is turned on as the terminals contact with each other, a warning lamp in a cluster is turned on to notify the water level to a driver.

Therefore, the driver recognizes the rise in the water level through the warning lamp to remove the water in the moisture separator.

The diesel engine is controlled by a failure diagnosis logic that diagnoses a failure of the water sensor to turn on the warning lamp to notify the driver when the failure occurs.

When the failure is sensed in the water sensor, the driver is notified by limiting an engine torque.

FIG. 1 is a flowchart illustrating a process of performing a water sensor failure diagnosis and an engine torque limit in a related art. FIG. 2 is a block diagram illustrating a water sensor 10, an engine control unit (ECU) 20, and a cluster controller 30.

Referring to FIGS. 1 and 2, when a failure occurs in the water sensor 10 mounted on a fuel filter (S1), the ECU 20 receives a signal transmitted from the water sensor 10 to recognize the failure of the water sensor 10 through a failure diagnosis logic (S2).

The water sensor 10 directly transfers a failure state to the cluster controller 30, and the cluster controller 30 exhibits a warning label through a display device 32 while turning on a warning lamp 31 in a cluster to notify a driver the failure (S3).

Subsequently, the ECU 20 performs a torque limitation to forcibly induce the driver to check a vehicle (S4).

The fuel filter and the water sensor 10, and the failure diagnosis of the water sensor 10 and the torque limitation during the failure are applied to the diesel hybrid vehicle. FIG. 3 is a diagram for describing a driving mode of a diesel hybrid vehicle.

In a diesel hybrid vehicle, a driving mode is determined by a hybrid control unit (HCU) according to a driving condition and an engine driving mode in which an engine runs and a hybrid driving mode in which the engine is turned off are repeated several times in one driving cycle.

When the diesel hybrid vehicle enters the hybrid driving mode while the engine is running, the engine stops (engine is turned off). Although the engine is turned off in the hybrid driving mode, the vehicle is on, and thus, the sensing operation of the water sensor 10 and the operation of the warning lamp 31 can be performed, and the failure of the water sensor 10 can be diagnosed.

When the ECU 20 recognizes the failure of the water sensor 10 in the hybrid driving mode, the ECU 20 immediately limits the torque while the engine is running in which the hybrid driving mode is changed to the engine driving mode by the HCU according to the driving condition while the hybrid driving mode is maintained.

When the failure occurs in the water sensor during the engine driving mode in which the engine runs, the engine torque limitation is immediately performed.

According to the related art, when the failure occurs in the water sensor in the hybrid driving mode, the engine torque limitation is immediately performed when the engine driving mode starts while there is no torque limitation during the hybrid driving mode. Thus, the forcible failure situation transferring method may cause driver's dissatisfaction with a vehicle system.

When the torque limitation to reduce the engine torque is achieved while the driver does not recognize the failure situation through the warning lamp and the warning label after the failure occurs in the water sensor, the driver may not feel safe and vehicle drivability and merchantability decrease.

The above information disclosed in this Background section is only for enhancement of understanding of the background of the disclosure, and therefore, it may contain information that does not form the prior art that is already known in this country to a person of ordinary skill in the art.

SUMMARY OF THE DISCLOSURE

The present disclosure has been made in an effort to solve the above-described problems associated with prior art and to provide a method for a torque limit having advantages of solving drivers anxiety due to rapid torque limit and contributing to improvement of drivability and productivity of the vehicle, by granting a sufficient time enabling a driver to recognize a failure condition during failure sensing of a water sensor.

According to an exemplary embodiment of the present inventive concept, a method for limiting an engine torque when a failure occurs in a water sensor of a fuel filter includes sensing the failure of the water sensor installed in the fuel filter through a failure diagnosis logic in a diesel hybrid vehicle. A current vehicle driving mode is checked when the failure of the water sensor is sensed. Whether a first time period elapses a first delay time after sensing the failure of the water sensor when the current vehicle driving mode is an engine driving mode is determined. The engine torque is limited and reduced when the first time period elapses the first delay time.

The method may further include storing failure state information of the water sensor when the vehicle driving mode is a hybrid driving mode in an engine off state after sensing the failure of the water sensor. A second time period is measured when the vehicle driving mode is changed from the hybrid driving mode to the engine driving mode while storing the failure state information. Whether the second time period after changing to the engine driving mode elapses a second delay time is determined. The engine torque is limited and reduced when the second time period elapses the second delay time.

A warning device may operate when the failure of the water sensor is sensed and inform a driver.

The warning device may be one or more of display devices that display a warning light in the cluster and warning labels.

An engine control unit (ECU) may sense the failure of the water sensor, and a cluster controller may receive failure state information from the ECU to operate the warning device.

In the method for limiting an engine torque in fail of the water sensor of the fuel filter according to the present disclosure, a torque limit entry is delayed for a predetermined delay time when the failure is sensed in the water sensor, thereby providing an additional time to inform a driver a failure condition.

Accordingly, it is possible to reduce driver's anxiety and complaints against a vehicle system and improve drivability and productivity of the vehicle.

Other aspects and exemplary embodiments of the inventive concept are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (for example, fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present disclosure.

Figure 1:
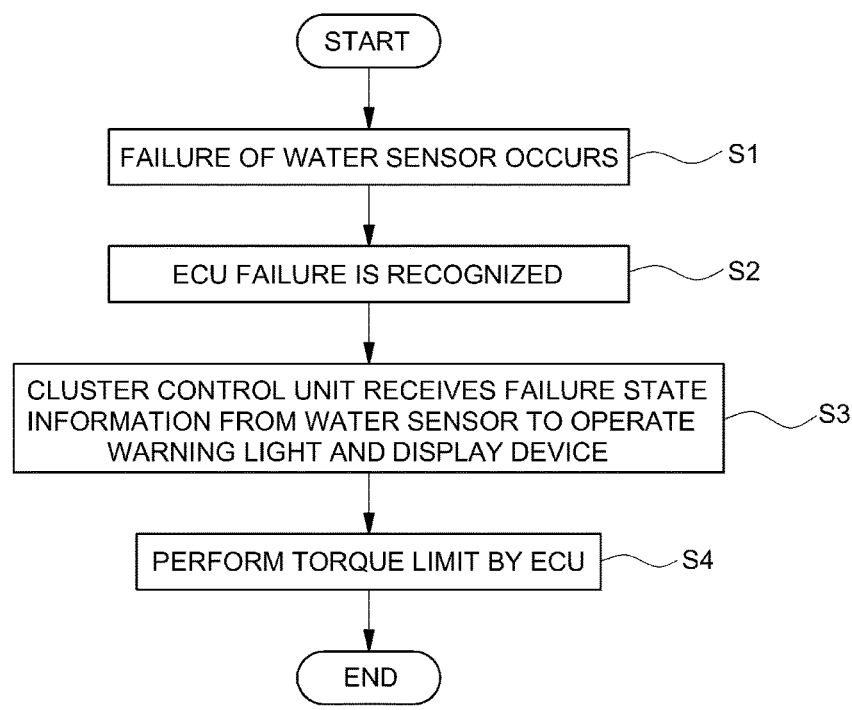
FIG. 1 is a flowchart illustrating a process of performing a water sensor failure diagnosis and engine torque limit in the related art.
Figure 2:
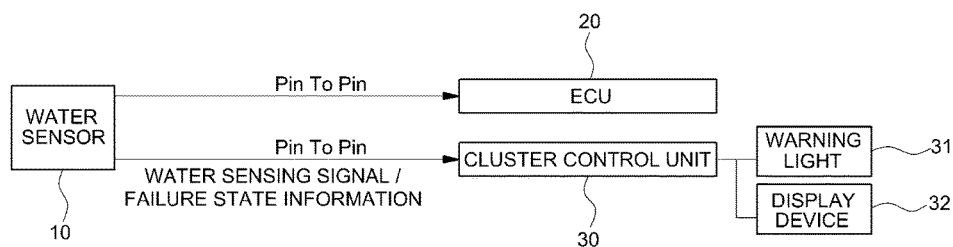
FIG. 2 is a block diagram illustrating a water sensor, an engine control unit (ECU), and a cluster controller.
Figure 3:
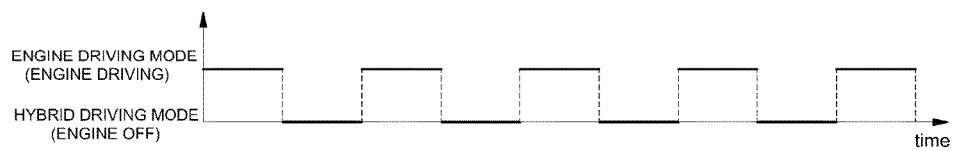
FIG. 3 is a diagram for describing a driving mode of a diesel hybrid vehicle.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present inventive concept, examples of which are illustrated in the accompanying drawings and described below. While the disclosure will be described in conjunction with exemplary embodiments, it will be understood that present description is not intended to limit the disclosure to those exemplary embodiments. On the contrary, the invention is intended to cover not only the exemplary embodiments, but also various alternatives, modifications, equivalents, and other embodiments, which may be included within the spirit and scope of the disclosure as defined by the appended claims.

Hereinafter, exemplary embodiments of the present inventive concept will be described in detail with reference to the accompanying drawings, so as to be easily implemented by those skilled in the art.

The present disclosure relates to a method for limiting a torque which gives a time enough for a driver to recognize a failure situation before entering torque limitation when a failure is sensed in a water sensor in a diesel hybrid vehicle to dissolve driver's anxiety due to a sudden torque limitation and contribute to improvement of drivability and merchantability of the vehicle.

Figure 4:
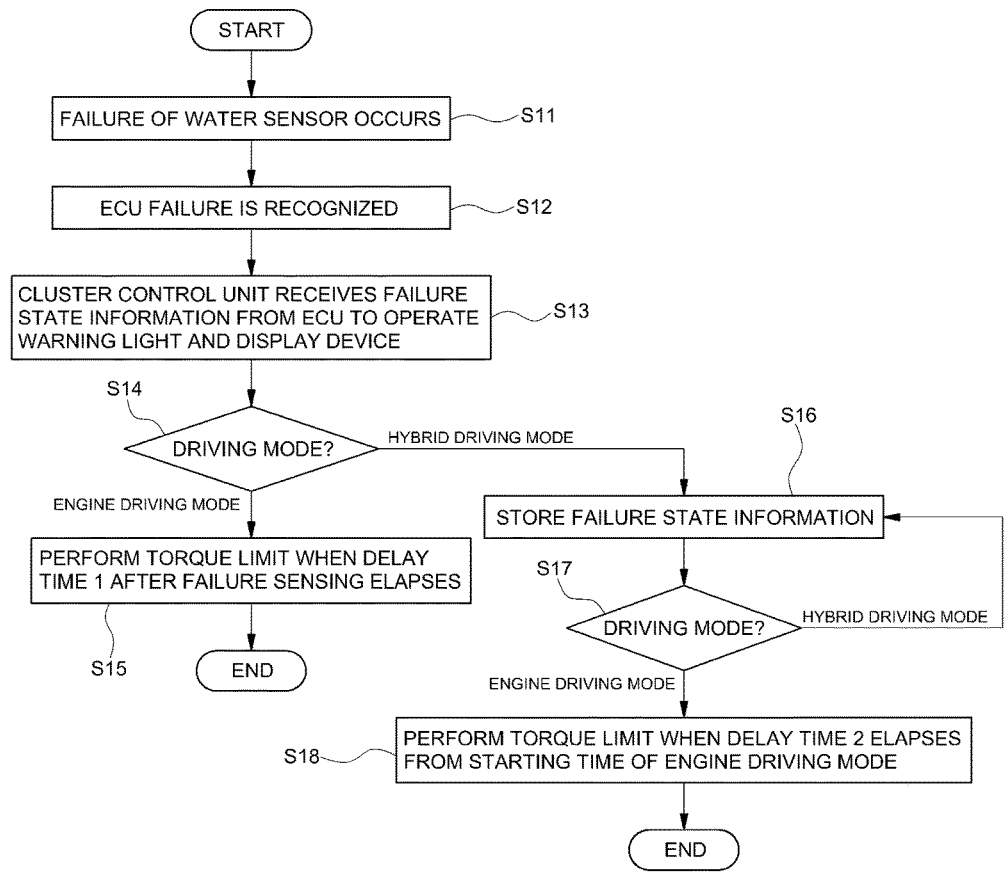
FIG. 4 is a flowchart illustrating a torque limit process according to the present disclosure.
Figure 5:
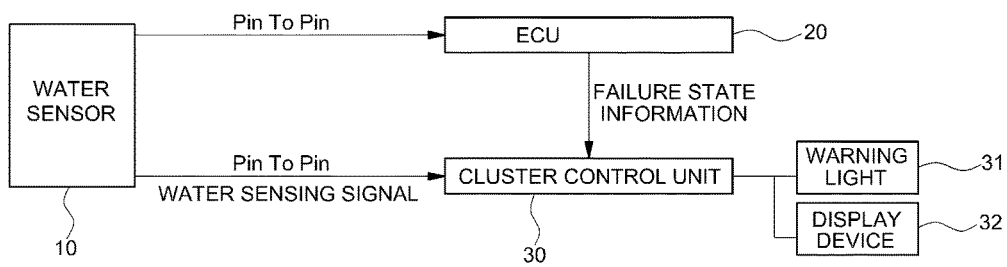
FIG. 5 is a block diagram illustrating a connection state between a water sensor, an ECU, and a cluster controller in the present disclosure.

FIG. 4 is a flowchart illustrating a torque limit process according to the present disclosure, and FIG. 5 is a block diagram illustrating a connection state between a water sensor 10, an ECU 20, and a cluster controller 30 in the present disclosure.

First, when a failure occurs in the water sensor 10 installed in the fuel filter (S11), the ECU 20 receives a signal transmitted from the water sensor 10 to recognize the failure of the water sensor 10 through a failure diagnosis logic (S12).

Next, the ECU 20, which recognizes the failure of the water sensor 10, transmits failure state information of the water sensor 10 to the cluster controller 30 through CAN communication and the cluster controller 30 receiving the failure state information operates a warning device in a cluster (S13).

That is, a warning light 31 is on, and simultaneously, warning labels are displayed through a display device 32 to inform a driver a failure condition.

Next, the ECU 20 checks a vehicle driving mode when the failure of the water sensor 10 is sensed (S14). When the current vehicle driving mode is an engine driving mode (engine driving), the ECU 20 performs the torque limit to reduce an engine torque when a first time period after sensing the failure elapses a first predetermined delay time 1 (S15) and informs the driver for repair therethrough.

Accordingly, as compared with the related art in which the engine torque is limited immediately in the failure sensing, the torque limit is performed with a predetermined delay time after sensing the failure. As a result, a time capable of sufficiently recognizing a failure condition by a warning light and warning labels may be provided to the driver, thus improving drivability/productivity.

During the failure sensing of the water sensor, while the driving mode is a hybrid driving mode, the failure state of the water sensor 10 is stored in the ECU (S16), and the ECU 20 stores failure state information with respect to the failure of the water sensor 10 which occurs for the hybrid driving mode before entering a next engine driving mode.

Thereafter, when the driving mode of the vehicle is changed to an engine driving mode by a hybrid control unit (HCU) (not illustrated) which is an upper controller, the ECU 20 checks a driving mode change state (S17) to measure a time period from an entry timing into the engine driving mode.

The ECU 20 performs the torque limit that reduces the engine torque when the time elapses a second predetermined delay time 2 (S18), and informs the driver a need for repair therethrough.

In the present disclosure, the first delay time 1 and the second delay time 2 may be the same time value or may be different time values.

As described above, in the present disclosure, unlike the related art in which the engine torque limit is performed immediately when a hybrid driving mode is changed to an engine driving mode when the failure of the water sensor is sensed for the hybrid driving mode, the engine torque limit is performed after a predetermined delay time from a mode change timing, thereby granting a sufficient time required for enabling a driver to recognize a failure condition through a warning light and warning labels and solving anxiety for a vehicle system which is felt by the driver due to immediately torque limit after the mode changing.

Accordingly, in the present disclosure, a time required for enabling a driver to recognize a failure condition may be additionally provided by delaying torque limit entry for a predetermined delay time during failure sensing of the water sensor.

Further, it is possible to solve driver's anxiety due to rapid torque limit and complaints against a vehicle system and contribute to improvement of drivability and productivity of the vehicle.

The inventive concept has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for limiting an engine torque when a failure occurs in a water sensor of a fuel filter, the method comprising steps:
   sensing, by an engine control unit (ECU), the failure of the water sensor installed in the fuel filter through a failure diagnosis logic in a diesel hybrid vehicle;
   checking, by the ECU, a current vehicle driving mode when the failure of the water sensor is sensed;
   determining, by the ECU, whether a first time period elapses a first delay time after sensing the failure of the water sensor when the current vehicle driving mode is an engine driving mode; and
   limiting and reducing, by the ECU, the engine torque when the first time period elapses the first delay time.

2. The method of claim 1, further comprising steps of:
   storing, by the ECU, failure state information of the water sensor when the vehicle driving mode is a hybrid driving mode in an engine off state after sensing the failure of the water sensor;
   measuring, by the ECU, a second time period when the vehicle driving mode is changed from the hybrid driving mode to the engine driving mode while storing the failure state information;
   determining, by the ECU, whether the second time period after changing to the engine driving mode elapses a second delay time; and
   limiting and reducing, by the ECU, the engine torque during driving when the second time period elapses the second delay time.

3. The method of claim 1, wherein a cluster controller receive failure state information from the ECU to operate a warning device and the warning device alerts a driver the failure of the water sensor when the failure of the water sensor is sensed by the ECU.

4. The method of claim 3, wherein the warning device is one or more of display devices that display a warning light in the cluster and warning labels.

5. The method of claim 4, wherein the ECU senses the failure of the water sensor.

* * * * *